(12) United States Patent
Martin, Jr. et al.

(10) Patent No.: US 12,147,995 B2
(45) Date of Patent: Nov. 19, 2024

(54) INTELLIGENT WRITE BACK FOR CUSTOMER RELATIONSHIP MANAGEMENT

(71) Applicant: Cross Commerce Media, Inc., New York, NY (US)

(72) Inventors: Russell W. Martin, Jr., New York, NY (US); Heidi Messer, New York, NY (US); Stephen Messer, New York, NY (US); Paolo Cappellari, New York, NY (US); Alejandro Tavella, New York, NY (US)

(73) Assignee: Cross Commerce Media, Inc., New York, NY (US)

( * ) Notice: Subject to any disclaimer, the term of this patent is extended or adjusted under 35 U.S.C. 154(b) by 392 days.

(21) Appl. No.: 17/121,357

(22) Filed: Dec. 14, 2020

(65) Prior Publication Data

US 2021/0182880 A1 Jun. 17, 2021

Related U.S. Application Data

(60) Provisional application No. 62/947,890, filed on Dec. 13, 2019.

(51) Int. Cl.
*G06Q 30/0201* (2023.01)
*G06F 9/54* (2006.01)
(Continued)

(52) U.S. Cl.
CPC ......... *G06Q 30/0201* (2013.01); *G06F 9/544* (2013.01); *G06F 16/2365* (2019.01);
(Continued)

(58) Field of Classification Search
CPC .................................................. G06Q 30/0201
See application file for complete search history.

(56) References Cited

U.S. PATENT DOCUMENTS

| 2002/0184170 A1* | 12/2002 | Gilbert | G06F 16/958 |
| | | | 707/E17.116 |
| 2003/0033155 A1* | 2/2003 | Peerson | G06Q 30/02 |
| | | | 705/1.1 |

(Continued)

OTHER PUBLICATIONS

Sallam, Rita L., et al. "Magic quadrant for business intelligence platforms." Gartner Group, Stamford, CT (2011). (Year: 2011).*

*Primary Examiner* — Andre D Boyce
(74) *Attorney, Agent, or Firm* — Troutman Pepper Hamilton Sanders LLP; Christopher C. Close, Jr.; Jacob M. Burr (57) ABSTRACT

Write back to customer relationship management systems is provided. Data logging of activities can be performed for sales professionals that use other third-party software solutions during their selling process. The logged data can be written back to the CRM system instead of needing input by the sales professionals. Certain data and generated insights can be written back to further enhance the data available to clients' sales organizations. Capability of writing back to target CRM systems can leverage existing APIs. Identification of data to be written back to the CRM systems is performed by an intelligent write back (IWB) system. The IWB system will write back to the standard objects in tenant CRMs. The IWB system can create custom fields within those objects for write back data.

20 Claims, 4 Drawing Sheets

(51) Int. Cl.
*G06F 16/23* (2019.01)
*G06F 16/25* (2019.01)
*G06N 5/02* (2023.01)
*G06Q 10/107* (2023.01)
*G06Q 10/1093* (2023.01)
*G06Q 30/01* (2023.01)
*G06Q 40/12* (2023.01)

(52) U.S. Cl.
CPC .............. *G06F 16/254* (2019.01); *G06N 5/02* (2013.01); *G06Q 10/107* (2013.01); *G06Q 10/1093* (2013.01); *G06Q 30/01* (2013.01); *G06Q 40/12* (2013.12)

(56) References Cited

U.S. PATENT DOCUMENTS

| | | | | |
|---|---|---|---|---|
| 2005/0060340 | A1* | 3/2005 | Sommerfield | G06F 16/254 707/999.102 |
| 2006/0229899 | A1* | 10/2006 | Hyder | G06F 16/954 705/321 |
| 2007/0294631 | A1* | 12/2007 | Wiseman | G06F 40/166 715/764 |
| 2010/0191700 | A1* | 7/2010 | Kumar | G06F 16/252 707/602 |
| 2013/0166596 | A1* | 6/2013 | Stumpf | H04L 63/102 707/783 |
| 2018/0330292 | A1* | 11/2018 | Gundappa | G05B 19/4185 |
| 2019/0065014 | A1* | 2/2019 | Richter | G06T 11/60 |
| 2020/0073972 | A1* | 3/2020 | Busjaeger | G06F 16/258 |
| 2020/0097475 | A1* | 3/2020 | Tran | G06F 16/23 |
| 2020/0134223 | A1* | 4/2020 | Ye | H04L 9/14 |

* cited by examiner

INTELLIGENT WRITE BACK FOR CUSTOMER RELATIONSHIP MANAGEMENT

CROSS-REFERENCE TO RELATED APPLICATIONS

This application claims the benefit of U.S. Provisional Application Ser. No. 62/947,890, filed on 13 Dec. 2019, the entire contents and substance of which is incorporated herein by reference in its entirety as if fully set forth below.

FIELD OF THE DISCLOSURE

The present disclosure relates generally to intelligent write back systems and methods. Particularly, embodiments of the present disclosure relate to intelligent write back systems and methods for customer relationship management.

BACKGROUND

Sales organizations rely on Customer Relationship Management (CRM) systems as the primary electronic (i.e., software) systems for managing selling processes. Most CRM systems are set up as databases with workflows built on top of them. The CRM systems are relied upon heavily by sales operations professionals and leveraged by managers to receive data to better understand what is happening in and around a selling process. Typically, sales professionals enter data into the CRM systems manually. But sales professionals are not incentivized to accurately and timely enter the data because the sales professionals receive minimal value from the CRM system. Instead, the managers receive the bulk of the value. This imbalance in the usefulness of the system versus the work that goes into making these electronic systems useful leads to poor data quality, thus potentially minimizing the usefulness of the electronic system. For example, if salespeople input inaccurate or untimely information into the system, any analysis that the system can perform on that data for the manager's benefit likely is useless.

CRM systems also offer marketing arms of sales organizations the opportunity to leverage the data in the system to generate more leads and communicate with leads, prospects, and customers. But again, these opportunities provided by the electronic systems are lost if the data going into the system is inaccurate, untimely, or otherwise unreliable.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The subject disclosure generally pertains to improvements to electronic customer relationship management systems. The disclosure captures data of activities being performed by sales professionals, during their selling process, using software solutions, thus eliminating existing systems' reliance on sales professionals manually entering timely and accurate information into the system for the systems' full potential to be realized. Examples of software solutions often referred to as "tools" include, but are not limited to email, calendar, VOIP, web meeting, contract management, instant messaging, price quoting, list management, email marketing, and expense management. Thus, according to various implementations, the disclosed systems and methods write back (or intelligently write back ("IWB") activities from the tools that sales professionals use into those sales professionals' CRM systems. Such IWB also can generate insights from the written back data to further enhance the data available to the sales organizations through the CRM systems.

In some implementations, IWB can be facilitated by, for example, an IWB system that leverages existing APIs between the CRM systems and the tools (or the systems supporting the tools). Such IWB systems (or, generally, "systems") can write back to the standard objects in tenant CRMs. Such systems also can leverage custom objects created by CRM owners as well as custom fields within those objects.

As will be appreciated, the subject innovation improves existing electronic CRM systems by providing substantial benefits in terms of data fidelity and homogeneity. For example, one advantage resides in a better capture of data from sales activities. Another advantage resides in automated determination of insights to better identify new information or insights for a CRM. As will be appreciated, both advantages improve the functionality and usefulness of existing CRM systems.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The subject disclosure generally pertains to systems and methods for improving customer relationship management systems. The disclosed systems and methods capture data of activities being performed by sales professionals using software solutions (i.e., tools) during their selling process and write that data back to existing CRM systems. In addition to writing back data from sales professionals' tools, intelligent write back (IWB) systems can generate certain insights based on the written back data and provide those insights to the CRM systems. Such IWB systems can leverage existing APIs. Further, the systems can write back to the standard objects in the CRMs or leverage custom objects created by CRM owners as well as custom fields within those objects.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
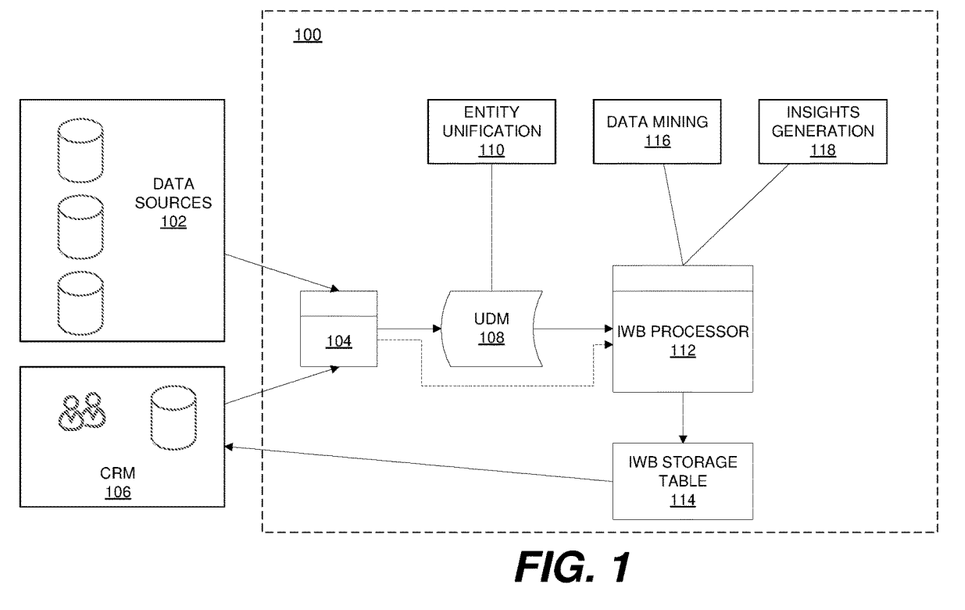
FIG. 1 illustrates an environment for intelligent write back to a CRM system in accordance with the present disclosure.

FIG. 1 illustrates an intelligent write back system 100 for intelligently writing back information to existing customer relationship management (CRM) systems. As shown in FIG. 1, IWB systems 100 can automate the data logging of activities being performed by sales professionals using third-party software solutions or tools during their selling process (collectively, data sources 102). These data sources 102 can include, for example and not limitation, email, calendar, voice over internet protocol (VOIP), web meeting, contract management, instant messaging, price quoting applications, list management, email marketing, and expense management.

IWB systems 100 can mine the data sources 102 for information. The system 100 can extract relevant data from the data sources 102 to a raw data table 104. In some embodiments, data may be ingested from a CRM 106 into the raw data table 104. The system 100 can perform an extract, transform, and load (ETL) function to pass the data into a universal data model (UDM) 108, as will be understood by those of skill in the art.

The UDM 108 can make use of processes for entity unification 110. Such entity unification processes can unify data from different sources to create a single, unified record for both people and organizations. The unification can be performed by a variety of methods known to those of ordinary skill in the art. For example, the system 100 can unify the data according to the systems and methods described in U.S. Pat. No. 8,825,618, owned by Applicant, which is incorporated herein by reference as if set forth in the disclosure below.

As will be appreciated, the UDM 108 can help ensure accuracy and cleanliness of data and can help improve many aspects of how companies can leverage their data, including data in a company's CRM 106. Data cleanliness is a significant issue for many CRMs as duplicate data, incorrect data, improperly entered data and/or the like create problems for how that data can be used for analysis, communication, decision making, and such. The UDM 108 can identify where data is either incomplete or incorrect and can ensure good data hygiene by augmenting data in the CRM 106 with the most accurate and up-to-date information available. Further, as the number of sources that are integrated grows (e.g., the CRM 106 and various data sources 102), the IWB processor 112 can help to ensure against duplicating the data when ingesting data from the data sources 102 and the CRM 106.

The UDM 108 can pass the data (including cleaned, accurate, and/or up to date data, as necessary) to an intelligent write back (IWB) processor 112. The IWB processor 112 can determine missing or incomplete data from the UDM 108, as necessary, and write back the information to the CRM 106 in effect augmenting or enhancing the original data to improve its overall quality and/or completeness of the data in the CRM 106. The IWB processor 112 can store the determined write back data (i.e., data that the system 100 determines should be communicated back to the CRM 106) in an IWB storage (STG) table 114. The IWB STG table 114 can push the write back data to the CRM 106 to complete the write back.

In some implementations, IWB processor 112 can analyze the data in the IWB STG table 114 to assign a confidence value to annotate to each attribute written back to the CRM 106. As will be appreciated, unifications processes, such as those disclosed herein, can analyze all records of the multi-tenant network (e.g., the CRM 106) and identify which records, from different tenants and data sources, are associated with the same entity (such as a person, or an organization). As the unification processes pick up these records, the data comprising the unified record can increase the accuracy of the data being written back to the CRM. As will be appreciated, some data sources can are better, so to speak, than others in terms of the information they provide to the system 100. For instance, data from an active user profile in the CRM system 106 can be better (e.g., more up to date, more accurate) than contact info from a random contact list (e.g., a contact list with no other context or associations) received from the data source 102. Those better records can can provide the basis for the generation of higher confidence/quality values.

CRM systems 106 receiving write back information from the system 100 can finely tune the quality of write back that they receive. For instance, the CRM 106 can start conservatively, selecting to receive write back information having a confidence value that is above a confidence threshold (e.g., a 90% confidence threshold). Alternatively, the CRM 106 could take a more aggressive approach and opt to receive write back information that is above a lower confidence value (e.g., a 50% confidence threshold). As will be appreciated, under the aggressive approach, the CRM 106 will receive more information from the system 100 during write back, and the quality of the written back data (e.g., the accuracy or usefulness) may be less than the written back data received under a more conservative approach.

Additionally, in some implementations, the IWB processor 112 can include certain data mining processes 116 for mining the data of the UDM 108. Through the data mining, the IWB processor 112 can determine if information received from a data source 102 is indicative of or related to an activity that is, in turn, related to an opportunity (e.g., a sales opportunity) in the CRM 106. For example, in the case of email and calendar, a majority of the work in associating these activities and events to opportunities in the CRM 106 can be performed through activity mining processes. The IWB processor 112, depending on the results of the email ingestion framework, can determine that an opportunity unique identifier (ID) included in an email may already exist in the CRM 106. The IWB processor 112 can associate the activities in the email or calendar with the opportunity ID to be written back to the CRM 106. In other words, the IWB processor 112 can notify the CRM 106 that a particular email, which is associated with a particular data source 102, should be associated with an opportunity in the CRM 106. Put differently, the IWB processor 112 may instruct the CRM 106 to associate a particular email with a particular opportunity.

In some examples, the IWB processor 112 can write back to the CRM 106 after ingesting the data to the raw table 104 from the data sources 102. Then, without processing the data in the UDM 108, the IWB processor 112 can store the determined write back data (i.e., data that the system 100 determines should be communicated back to the CRM 106) in the IWB storage (STG) table 114. The IWB STG table 114 can push the write back data to the CRM 106 to complete the write back. In such a manner, the IWB system 100 can bypass many actions of the IWB processor 112 to speed up the write back process.

In cases where the IWB processor 112 fails to identify a direct link or association between information from a data source 102 (e.g., an email or calendar) and an opportunity in the CRM 106, IWB processor 112 can seek to match the activities from the data sources 102 to open opportunities to facilitate determining which data should be written back to the CRM 106, and to which opportunities that data should be associated. The IWB processor 112 can include the determination in the data mining processes to create associations in relation to opportunities. As will be appreciated, such processes allow for a more complete and accurate capturing of activities performed, actors involved, and other attributes related to the opportunity than is provided in current CRM systems, which rely on salespeople correctly and timely inputting such information and making such associations.

Further still, the IWB processor 112 can include methods for insight generation 118. In addition to processing and unifying data across data sources 102, the IWB processor 112 can leverage a network of data to generate insights pertaining to the data. The insights can include recommendations and alerts to guide users of a CRM to the most important actions they can take. The insights can be valuable to users and can be included with the data that is written back to the CRM 106. For example, the data mining processes may identify a member of the user's network who the user knows or should know and recommend that the user connect related to a person or opportunity. This recommendation may be determined from the data in the UDM and or an understanding of the relationships among different entities. Other examples where system-generated recommendations can help improve a seller's likelihood of success may include: suggesting a person in their organization who knows members of the buyer team associated with an opportunity, recommending updates to contact/title information, identifying risks related to an opportunity, making a recommendation to contact a buyer related to a past or upcoming meeting, among others.

Apart from emails and calendar events, the IWB processor 112 can write back activities from other sources. For instance, the IWB processor 112 can write back data obtained by the system 100 from the addition of buyers and contacts via a user interface (UI), and the addition of selling team members via UI, bidirectional sync of opportunities, plays/tasks, or accounts creation. As will be appreciated, such data sources can aid in providing insights such as recommended sellers, recommended connectors, that a connector and buyer connected, that a buyer was a person in the news, that a buyer's birthday has occurred or is upcoming, opportunity momentum, opportunity risk, and network and inactive seller addition, among others.

In some implementations, providing such insights can involve two primary aspects, among other things. First, knowing the source from which information is being received allows the system 100 to assess the quality of the incoming information. So in an example where the system 100 receives a user's contact information, data coming from an email (e.g., from signature mining), or data from a digital video meeting, can provide a more accurate and higher quality insight to the system 100. This insight can feed back into the confidence/quality score generation. Additionally, the system 100 can annotate data written-back to the CRM 106 not only with a confidence score but also with information about why the system 100 made such a determination for the score. For instance, the system 100 can indicate that the confidence score for a buyer is 66% because the same record has been found in majority of the records evaluated by the system 100. As another example, the system 100 can provide the score for an email address as 100% because it has been found in actual email correspondence and not just in contact records from the CRM 106.

In some implementations, the IWB processor 112 can provide capability of writing back to the CRM 106 by leveraging existing application programming interfaces (APIs). In some embodiments, tenants enable permissions to allow the IWB processor 112 to write data back into the CRM 106. As discussed, the IWB processor 112 can identify data to be written back to the CRM 106. In some implementations, data into the system 100 flows into the UDM 108, which can be the primary source for all network data. Then, as appropriate, the IWB processor 112 can write back to one or more standard or custom objects in a tenant's CRM 106. The IWB processor 112 can create custom fields within the standard objects for some business purposes. For example, the IWB processor 112 can be configured to create custom fields or objects during the tenant setup process to ensure data are written back to the correct fields or objects.

As will be understood by those of skill in the art, CRM users or administrators often create custom objects, which include custom fields, to track certain information that go beyond the standard objects and fields provided by the various CRM platforms. In such instances, the system 100 can receive data indicative of those custom objects and fields. Upon receipt of information relating to those custom fields and objects, the system can write back that received information to the standard objects and fields of the relevant CRM. As will be appreciated, but writing back the relevant information to the standard objects and fields of the relevant CRM, that CRM can receive the value of the information received, recognized, and determined by the system 100 without any necessary custom configuration of the CRM to allow communication between the CRM and the system 100.

So in an example scenario, where a particular CRM tracks buying or selling team members within opportunities, account, or contact custom fields or within custom objects, the system 100 can, as information is received and determined to be relevant to those customer fields, write back the relevant information to the standard objects for tracking these relationships. Again, as will be appreciated, such a construction for the writing back to standard objects can allow the CRM 106 to continue to receive the benefits of write back from the IWB system 100 without requiring any additional custom development work to match custom and standard objects.

Additionally, in some CRM configurations, certain objects represent relationships between two master objects. For example, one master object can represent an opportunity and another master object can represent a contact. Thus in an example, a relationship standard object (e.g., Opportunity-ContactRole or other combination of master objects and another object representing a relationship between the two depending upon each CRM 106) tracks what role a contact plays in an opportunity (e.g., Michael Jordan (i.e., the contact) plays the role of decision maker for the "Charlotte Hornets 2021 Q1 Sale" opportunity). As will be understood by those of skill in the art, for various reasons, in such situations, CRM users often decide to have a link to the contact already present at the master opportunity object. That link can have a customer field name (i.e., decision maker) within the opportunity (i.e., Charlotte Hornets 2021 Q1 opportunity) and can be populated with the contact (i.e., Michael Jordan). Accordingly, as will be appreciated, with such a setup, any native reporting in the CRM 106 that pulls data from the standard relationship object would miss the fact that the contact is a buyer for that opportunity because it is not tracked at the standard OpportunityContactRole object. The presently disclosed IWB system 100, however, can automatically track such relationships, avoiding the manual effort involved by the CRM 106.

This automatic tracking of relationships can be done during, for example the data augmentation. The IWB system 100 can obtain opportunity data from a master record (e.g., the identification of the opportunity and the identification of the contact information of the buyer), which can be tracked in the custom field from the opportunity. The IWB system 100 can use a parameterized internal mapping regarding the role of the buyer/seller depending on which custom field in the master object corresponds to the opportunity data. For instance, an opportunity master object can have a decision maker custom field populated with a first contact and a buyer custom field populated with a second contact. Instead of tracking the custom fields at a standard relationship object, when the IWB system 100 writes back the data to the CRM 106 standard object, the system 100 can do so with an entry for the opportunity and the first contact with the role of the contact being a decision maker. The system 100 can also write back an entry for the opportunity and the second contact with role of the second contact being a buyer as the IWB system 100 can check which role to map the buyer to while taking into account which field the buyer is tracked in. These tracking parameters can be determined by a tenant of the CRM 106 or a user of the IWB system 100 in a predetermined configuration during the setup of the IWB system 100.

In some embodiments, the IWB processor 112 can write back information from data sources 102 to the CRM 106. For example, the system 100 may receive information from a data source 102 relating to emails and determine that the emails specifically relate to open opportunities in the CRM 106. Accordingly, the system 100 can write back information relating to those emails to the CRM 106 with appropriate associations such as: Contact, Opportunity, Activity, and/or the like. Data from fields to write back can include: From, to, cc, date/time, subject, message body, marked urgent, presence of attachments (but not the attachments itself). Other data the IWB processor 112 can write back can include emails, Replies to Emails (threads), Auto-responses (e.g. out of office, no longer at company), Bounce backs, and the like. As will be appreciated, such automated write back of emails from the data source 102 to the CRM 100 via the system 100 improves the information in the CRM 106 and relieves CRM users of the burden of associating, for example, their emails to opportunities in the CRM 106.

Similarly, in some embodiments, the system 100 can write back calendar data received from the data sources 102 to the CRM 106. For example, the system 100 can write back calendar events specifically related to open opportunities in the CRM 106 with the appropriate associations to: Contacts, Opportunities, Activities, and/or the like. Data from fields to write back include: Meeting organizer, invited members, subject, time sent, meeting date/time, location, dial-in, web conferencing details. The system 100 can likewise write back Calendar Invitations, Accepted Invitations, Declined Invitations, Changes to Invitations, Meeting Attendance Summary, Recurring Meetings, recurring meetings, and/or the like. Further, the system 100 can write back (or update) to the CRM 106 changes to meetings to the fields in the CRM 106. The updates may be threaded, appended with the updates, or in a new field.

Further, in some embodiments, the system 100 can write back to the CRM 106 new buyer contact data received from data sources 102. For example, data mining processes may identify, from data received from data sources 102, new participants in the buying process from a target opportunity and determine that the new participants should be included in a buying team as reflected in the opportunity at the CRM 106. According to some implementations, once the data mining processes make such determinations, the associated data can be written to the UDM 108. The IWB processor 112 can then identify such information as information that should be written back to CRM 106. If the contact already exists in CRM 106 then it is associated with the opportunity in CRM 106. If the contact doesn't exist a new contact can be created and associated with the opportunity.

In some embodiments, the system 100 can write back other activity data as received from the data sources 102 to the CRM 106. For example, the system 100 can write back comments and threads from deal rooms, instant messages (e.g. Slack, Gchat), voice-over-IP information (e.g. Dialpad, Trello, RingCentral), CPQ, email marketing, expense information from expense management systems, additions to selling teams, alerts and notifications, and the like. In each instance, the system 100 can, after receiving such data, make a determination as to whether the data should or can be associated to an opportunity in the CRM 106 and provide that in formation to the CRM 106 when writing back the information. As will be appreciated, selling team additions, alerts and notifications, comments/threads, and plays from deal rooms are important elements in helping to keep CRM systems 106 in sync with activities and tasks that are performed related to an opportunity. And existing CRM systems 106, which rely on users to input such information, suffer from untimely and inaccurate information being inputted into the system.

In some embodiments, the system 100 can create and update opportunities in the CRM 106 and accounts created in other systems. In some embodiments, the system 100 can deduplicate accounts and contacts in the CRM 106 along with reassociating linked objects to the master account or contact remaining post deduplication. Further, in some embodiments, the system 100 can write back entities like Contacts and Accounts into systems other than the CRM 106 (e.g., into certain data sources 102).

In some embodiments, the system 100 can generate detailed reports regarding the CRM 106 and various write backs (e.g., activities, contacts, and the like). The system 100 can generate and provide reporting to clients of the CRM 106 that are related to areas such as: number of activities written back, number of new contacts added, number of contacts whose data was updated/enhanced, number of accounts updated/enhanced, and other similar information. In some embodiments, the system 100 can provide such reporting to clients in a document format, and the reporting can be provided on a periodic basis (e.g. weekly, monthly, and/or the like).

In some embodiments, the system 100 can generate and provide links in the CRM 106 views (e.g., deal room, account page, forecast, contacts, and such). As will be appreciated, such links can facilitate the clients accessing the system 100 to access reports, information, and/or the like.

The IWB system 100 also can account for archival and roll-back of write back data in the CRM system 106. As transactions are archived, a deleted record can be restored, an inserted record can be deleted, and an updated record can be reverted to its previous state before update. Such information can be included in the annotation that the system 100 writes back in case a CRM 106 makes the decision to revert some changes to show the CRM 106 that the original data has been restored from the archive.

While the above IWB system 100 is described with respect to writing back to the CRM 106, it is understood that the IWB system 100 can write back to other components, sources, and/or systems rather than the CRM 106. For instance, the IWB system 100 can write back to a marketing augmentation system, a price quoting system (where, for example activity captured and identified by the system 100, such as a user updating a price or a quote in an email or telephone call transcript, can be written back to the price quoting system), an expense report management system (where, for example, the system 100 might identify information relating to an expense or expense report and write such information back to the expense report management system), and the like. Similarly, in some embodiments, based on email or calendar activity detected by the system 100, the system could create new contacts to be added to a user's email system (e.g., Gmail or Outlook) or videoconferencing or VOIP systems (e.g, Zoom or WhatsApp). Further, in some embodiments, the system 100 could analyze calendar events from buyers and/or sellers and email traffic from those buyers and/or sellers, and generate new calendar events to be written back to the user's calendar application. Additionally, in some embodiments, the system 100 may detect acceptances of calendar invites from system users (e.g., buyers and/or sellers) and autogenerate a draft email message auto-filled with information specific to the calendar invite acceptance to be written back to a user's email system. In some implementations, the system 100 can, based on detected activity relating to an opportunity, generate an audio message summarizing the detected information and write the audio message back to a phone system associated with a user (e.g., as a voicemail message).

The aforementioned systems, architectures, platforms, environments, or the like have been described and shown in FIG. 1 with respect to interaction between several components to provide an overview of the manner in which the disclosed technology can function and be architected. Such descriptions and figures are not intended to be limiting. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art. Furthermore, while the components of the IWB system 100 as shown in FIG. 1 are illustrated as separate components, it is understood that the components can be a part of a single component and/or work in conjunction with one another in a single computing device.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Among other things, such components can automate certain mechanisms or processes performed thereby to make portions of the systems and methods more adaptive as well as efficient and intelligent.

Figure 2A:
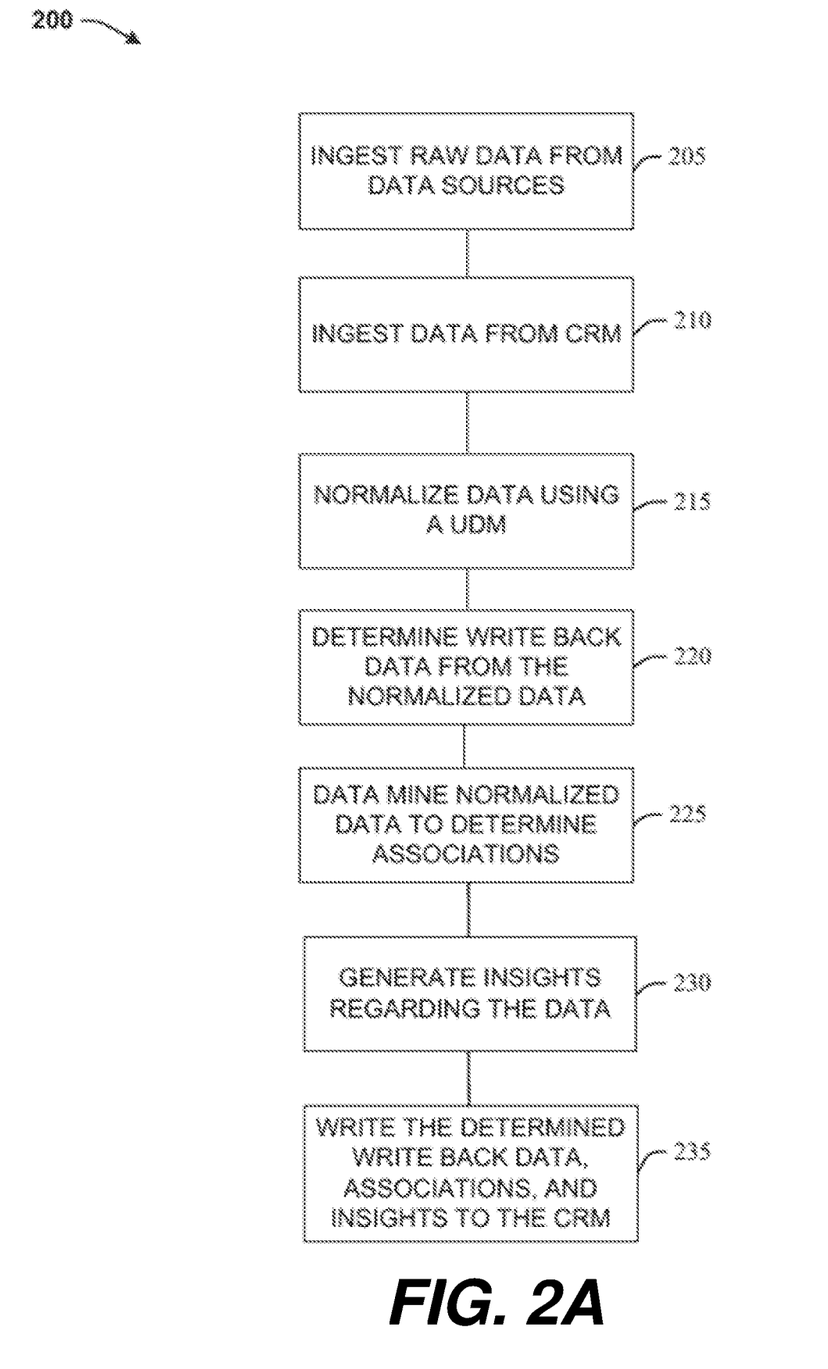
FIG. 2A illustrates a method for intelligent write back to a CRM system in accordance with the present disclosure.

In view of the exemplary systems described above, methods that may be implemented in accordance with the disclosed subject matter will be better appreciated with reference to flow chart diagram of FIG. 2A. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 2A illustrates a method 200 for intelligent write back to a CRM system (e.g., CRM 106). As shown, in some implementations, raw data can be ingested 205 from data sources. The data sources can be software solutions used by sales professionals associated with a CRM. Similarly, the system 100 can ingest 210 data from a CRM. Once the data is ingested from the various sources, the system can normalize 215 the ingested data according to one or more data models including, for example, a universal data model (UDM). As will be appreciated, a UDM can ensure that all ingested data is in the same format for ease of comparison. After normalizing the data, the system 100 can determine 220 write back data from the normalized data. In some implementations, an IWB system can make such determinations. Additionally, the system can evaluate data fields to determine missing data, updated data, differing data, and such. For example, the system 100 can compare data from the CRM to data from the data sources to determine missing data, updated data, differing data, incorrect data, and/or the like. In turn, the system 100 can write back such missing data, updated data, incorrect data, etc., to the CRM and/or one or more data sources.

As further shown in FIG. 2A, the system can data mine 225 the normalized data. As will be appreciated, such data mining facilitates determining associations between data from the data sources and opportunities with opportunity identifiers in the CRM such that write back data is written back to the correct entry in the CRM. Additionally, the system 100 can generate 230 insights for the write back data. These insights can include recommendations and alerts to guide CRM users to the most important actions they can take (e.g., sending emails, scheduling calls/meetings, following up on opportunities, making new connections, etc.). As is also shown in FIG. 2A, the system can write back 235 the write back data, the associations, the insights, and the like to the CRM. As will be appreciated, the write back function ensures that all pertinent data becomes integrated into the CRM so that users of the CRM will have a more complete view of opportunities, activities, customer information, and such.

Figure 2B:
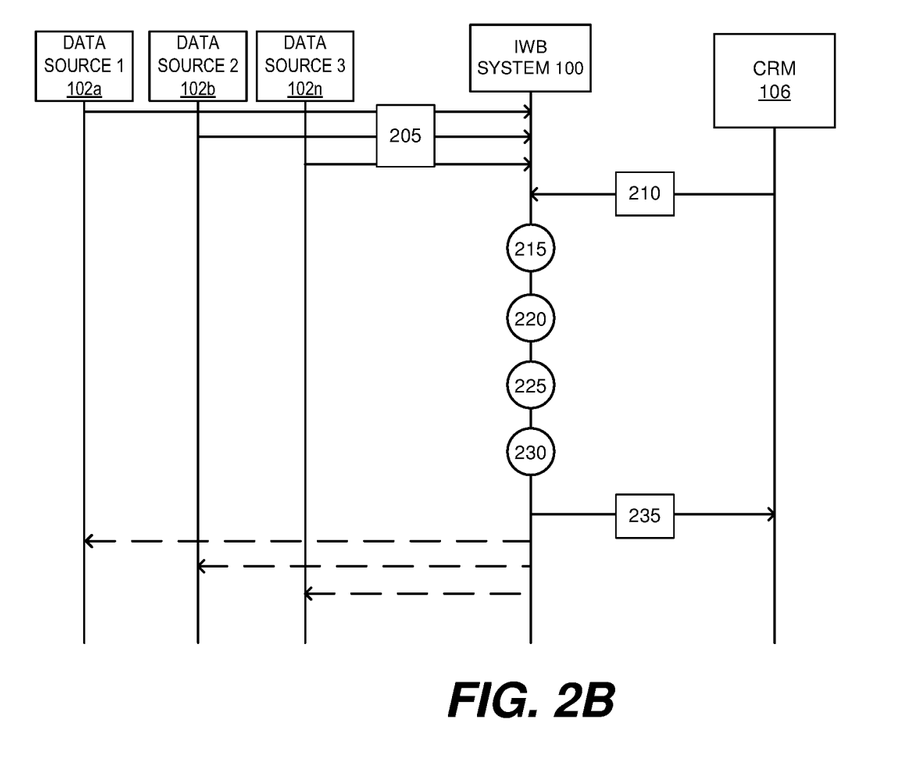
FIG. 2B illustrates a timing diagram for intelligent write back to a CRM system in accordance with the present disclosure.

FIG. 2B illustrates a timing diagram for the method illustrated in FIG. 2A. As shown, the system 100 can ingest raw data from the data sources 102 at 205. The system 100 also can ingest data from the CRM 106 as discussed at 210. Further, the system 100 can normalize ingested data (as shown at 215) according to, for example, a universal data model 108. As discussed, the UDM 108 can help ensure that all data is in the same format for ease of comparison. The system 100 can then determine write back data from the normalized data (as shown at 220). In some implementations, the system 100 can determine write back data using the IWB processor 112. The system 100 also can analyze data fields to determine missing data, updated data, differing data, and such. Similarly, the system 100 can compare data from the CRM 106 to the data from the data sources 102 to determine missing data, updated data, differing data, incorrect data, and such. Once identified, such data can be determined as write back data to be written back to the CRM 106.

As shown, the system 100 also can data mine the data (as shown at 225). Once the data has been mined, the system can identify associations between data from the data sources 102 and opportunities within the CRM 106 using, for example, opportunity identifiers, such that data-mined write back data is written back to the correct entry in the CRM 106. The system 100 also can generate insights for the write back data (as shown at 230). The insights can include recommendations and alerts that can help to guide CRM users to the most important actions they can take using the CRM system. Then, the system 100 can write the write back data, the associations, the insights, and such to the CRM 106, as shown in 235. The write back function ensures that all pertinent data becomes integrated into the CRM 106 for a more complete view of opportunities, activities, customer information, and related information.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 3:
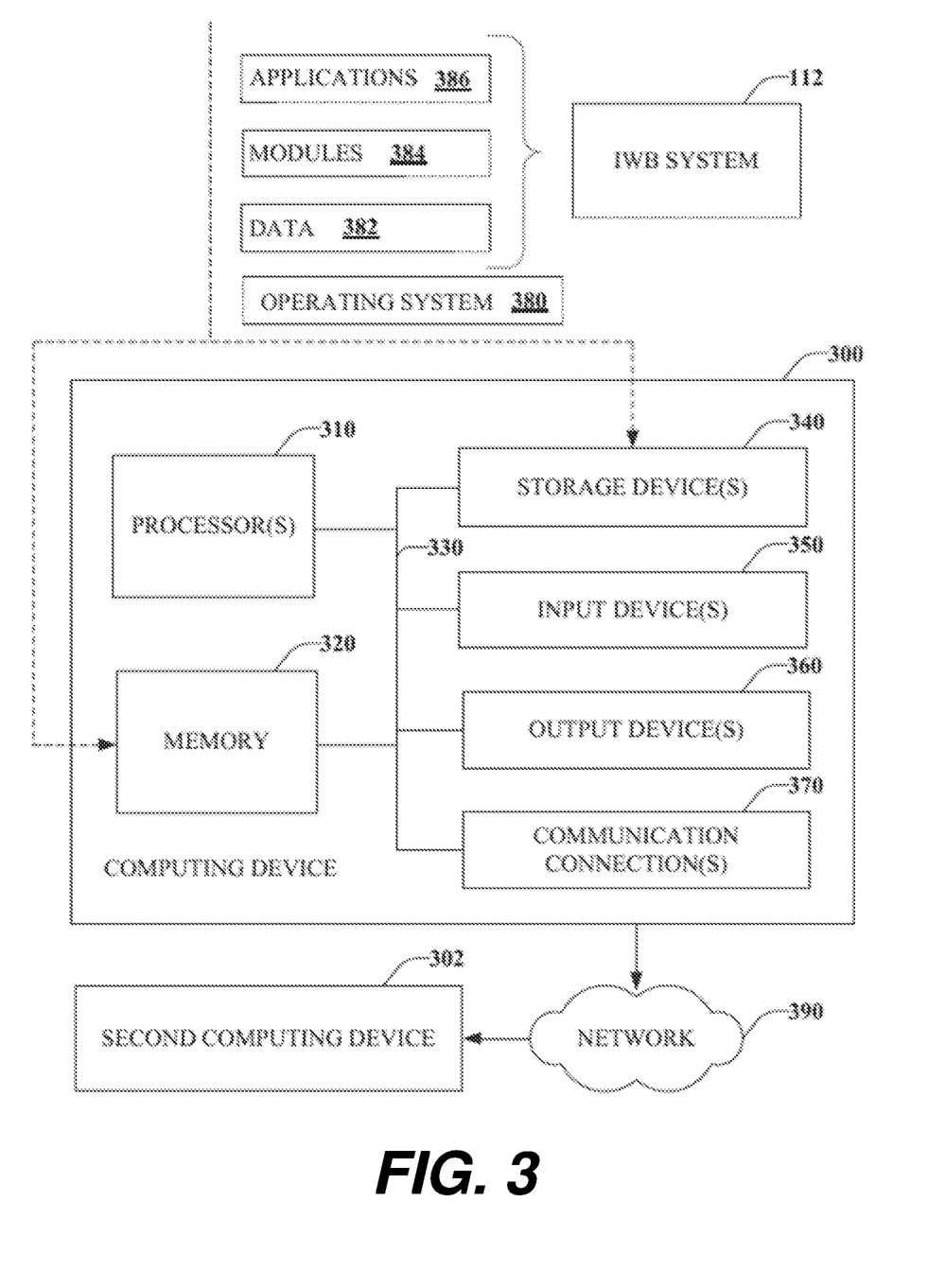
FIG. 3 illustrates a computing environment where one or more of the provisions set forth herein can be implemented, in accordance with the present disclosure.

To provide a context for the disclosed subject matter, FIG. 3 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, minicomputing devices, server computers, as well as personal computers, hand-held computing devices (e.g., personal digital assistant (PDA), smart phone, tablet, watch), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices. Aspects may also be practiced in a server-less computing environment.

With reference to FIG. 3, illustrated is an example computing device 300 (e.g., desktop, laptop, tablet, watch, server, hand-held, programmable consumer or industrial electronics, set-top box, game system, compute node). The computing device 300 includes one or more processor(s) 310, memory 320, system bus 330, storage device(s) 340, input device(s) 350, output device(s) 360, and communications connection(s) 370. The system bus 330 communicatively couples at least the above system constituents. However, the computing device 300, in its simplest form, can include one or more processors 310 coupled to memory 320, wherein the one or more processors 310 execute various computer executable actions, instructions, and or components stored in the memory 320.

The processor(s) 310 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 310 may also be implemented as a combination of computing devices, for example a combination of a DSP and a microprocessor, a plurality of microprocessors, multicore processors, one or more microprocessors in conjunction with a DSP core, or any other such configurations. In one embodiment, the processor(s) 310 can be a graphics processor unit (GPU) that performs calculations with respect to digital image processing and computer graphics.

The computing device 300 can include or otherwise interact with a variety of computer-readable media to facilitate control of the computing device to implement one or more aspects of the disclosed subject matter. The computer-readable media can be any available media that is accessible to the computing device 300 and includes volatile and nonvolatile media, and removable and non-removable media. Computer-readable media can comprise two distinct and mutually exclusive types, namely storage media and communication media.

Storage media includes volatile and nonvolatile, removable, and nonremovable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like mediums that store, as opposed to transmit or communicate, the desired information accessible by the computing device 300. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 320 and storage device(s) 340 are examples of computer-readable storage media. Depending on the configuration and type of computing device, the memory 320 may be volatile (e.g., random access memory (RAM)), nonvolatile (e.g., read only memory (ROM), flash memory) or some combination of the two. By way of example, the basic input/output system (BIOS), including basic routines to transfer information between elements within the computing device 300, such as during start-up, can be stored in nonvolatile memory, while volatile memory can act as external cache memory to facilitate processing by the processor(s) 310, among other things.

The storage device(s) 340 include removable/non-removable, volatile/nonvolatile storage media for storage of vast amounts of data relative to the memory 320. For example, storage device(s) 340 include, but are not limited to, one or more devices such as a magnetic or optical disk drive, floppy disk drive, flash memory, solid-state drive, or memory stick.

Memory 820 and storage device(s) 340 can include, or have stored therein, operating system 380, one or more applications 386, one or more program modules 384, and data 382. The operating system 380 acts to control and allocate resources of the computing device 300. Applications 386 include one or both of system and application software and can exploit management of resources by the operating system 380 through program modules 384 and data 382 stored in the memory 320 and/or storage device(s) 340 to perform one or more actions. Accordingly, applications 386 can turn a general-purpose computer 300 into a specialized machine in accordance with the logic provided thereby.

All or portions of the disclosed subject matter can be implemented using standard programming and/or engineering techniques to produce software, firmware, hardware, or any combination thereof to control the computing device 300 to realize the disclosed functionality. By way of example and not limitation, all or portions of the IWB processor 112 can be, or form part of, the application 386, and include one or more modules 384 and data 382 stored in memory and/or storage device(s) 340 whose functionality can be realized when executed by one or more processor(s) 310.

In accordance with one particular embodiment, the processor(s) 310 can correspond to a system on a chip (SOC) or like architecture including, or in other words integrating, both hardware and software on a single integrated circuit substrate. Here, the processor(s) 310 can include one or more processors as well as memory at least similar to the processor(s) 310 and memory 320, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the IWB processor 112 and/or functionality associated therewith can be embedded within hardware in a SOC architecture.

The input device(s) 350 and output device(s) 360 can be communicatively coupled to the computing device 300. By way of example, the input device(s) 350 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 360, by way of example, can correspond to a display device (e.g., liquid crystal display (LCD), light emitting diode (LED), plasma, organic light-emitting diode display (OLED), or other similar displays), speakers, voice user interface system, printer, and vibration motor, among other things. The input device(s) 350 and output device(s) 360 can be connected to the computing device 300 by way of wired connection (e.g., bus), wireless connection (e.g., Wi-Fi, Bluetooth, or other wireless connections), or a combination thereof.

The computing device 300 can also include communication connection(s) 370 to enable communication with at least a second computing device 302 by means of a network 390. The communication connection(s) 370 can include wired or wireless communication mechanisms to support network communication. The network 390 can correspond to a local area network (LAN) or a wide area network (WAN) such as the Internet. The second computing device 302 can be another processor-based device with which the computing device 300 can interact. For example, the computing device 300 can correspond to a server that executes functionality of IWB processor 112, and the second computing device 302 can be a user device that communications and interacts with the computing device 300.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. An intelligent write back method comprising:
logging one or more sales activities from one or more data sources, the one or more sales activities corresponding to one or more sales associates under an external customer relationship management (CRM) system;
extracting sales data from each of the one or more data sources based at least in part on a confidence threshold, wherein the sales data extracted from each data source has a format corresponding to a respective third party, a contact associated with the sales data, and an assigned confidence value that is greater than the confidence threshold;
receiving, over a first network, opportunity data from the external CRM system, the opportunity data indicative of an opportunity and including a list of contacts associated with the opportunity;
determining whether the sales data is associated with the opportunity;
updating the list of contacts associated with the opportunity with the contact associated with the sales data;
normalizing the sales data from the one or more data sources in a universal data model having one or more incorrect data entries, wherein the universal data model has a format different from a format of each respective third party;
augmenting the one or more incorrect data entries with an intelligent write back (IWB) system to rectify the one or more incorrect data entries to create a write back storage table; and
writing back, over a second network and by the IWB system, the write back storage table to the external CRM system, the write back storage table including the assigned confidence value for each data source, an indication of whether the sales data is associated with the opportunity, the updated contact list associated with the opportunity, and information associated with determination of the assigned confidence value.

2. The method of claim 1, further comprising:
data mining the universal data model to determine one or more activities performed by the one or more data sources; and
determining that the one or more activities are related to the opportunity.

3. The method of claim 1, further comprising:
generating one or more insights related to the universal data model, the one or more insights each corresponding to one or more recommended user actions; and
writing back the one or more recommended user actions to the external CRM system.

4. The method of claim 1, wherein the writing back to the external CRM comprises writing back one or more of: an email, a calendar event, a new buyer contact, a comment from a deal room, or a thread from a deal room.

5. The method of claim 1, wherein the writing back further comprises creating a custom field by the IWB system within the CRM system.

6. The method of claim 1, wherein the one or more incorrect data entries are determined by comparing the sales data to CRM history data from the CRM system.

7. The method of claim 1, wherein the writing back further comprises integrating the universal data model into an application programming interface (API) of the external CRM system.

8. The method of claim 7, wherein the API is a tenant API that has granted permission to the IWB system to write data back into the external CRM system.

9. An intelligent write back (IWB) system comprising:
a processor; and
a memory storing instructions that, when executed by the processor, cause the intelligent write back system to:
log one or more sales activities from one or more data sources, the one or more sales activities corresponding to one or more sales associates under an external customer relationship management (CRM) system;
extract sales data from each of the one or more data sources based at least in part on a confidence threshold, wherein the sales data extracted from each data source has a format corresponding to a respective third party, a contact associated with the sales data, and an assigned confidence value that is greater than the confidence threshold;
receive, over a network, opportunity data from the external CRM system, the opportunity data indicative of an opportunity, and including a list of contacts associated with the opportunity;
determine whether the sales data is related to the opportunity;
update the list of contacts associated with the opportunity with the contact associated with the sales data;
normalize the sales data from the one or more data sources in a universal data model having one or more incorrect data entries, wherein the universal data model has a format different from a format of each respective third party;
augment the one or more incorrect data entries to rectify the one or more incorrect data entries to create a write back storage table; and
write back, over the network, the write back storage table to the external CRM system, the write back storage table including the assigned confidence value for each data source, an indication on whether the sales data is related to the opportunity, and the updated contact list associated with the opportunity.

10. The system of claim 9, wherein the instructions further cause the IWB system to:
data mine the universal data model to determine one or more activities performed by the one or more data sources; and
determine that the one or more activities are related to the opportunity.

11. The system of claim 9, wherein the instructions further cause the IWB system to:
generate one or more insights related to the universal data model, the one or more insights each corresponding to one or more recommended user actions; and
write back, over the network, the one or more recommended user actions to the external CRM system.

12. The system of claim 9, wherein the writing back to the CRM comprises writing back one or more of: an email, a calendar event, a new buyer contact, a comment from a deal room, or a thread from a deal room.

13. The system of claim 9, wherein the instructions further cause the IWB system to:
create a custom field within the external CRM system during a tenant setup process.

14. The system of claim 9, wherein the one or more incorrect data entries are determined by comparing the sales data to CRM history data from the external CRM system.

15. The system of claim 9, wherein the writing back further comprises integrating the universal data model into an application programming interface (API) of the external CRM system.

16. The system of claim 15, wherein the API is a tenant API that has granted permission to the IWB system to write data back into the external CRM system.

17. A system comprising:
a processor;
a storage device;
a universal data model in communication with the processor and the storage device, the universal data model configured to: (i) receive, over a network, sales data from an external CRM system, the sales data containing a contact associated with the sales data and data that has an assigned confidence value that is greater than a predetermined confidence threshold, (ii) receive one or more sales activities from one or more data sources, wherein each of the data sources has a data format disparate from one another; (iii) receive a list of contact associated with the one or more sales activities; and (iv) normalize the one or more sales activities from the one or more data sources;
an intelligent write back system in communication with the processor, the storage device, and the universal data model, the intelligent write back system configured to: (i) receive the normalized one or more sales activities from the universal data model, (ii) compare the normalized one or more sales activities to the sales data from the external CRM system, (iii) compare the contact associated with the sales data with the list of contacts associated with the one or more sales activities; and (iv) augment the normalized one or more sales activities to account for an inconsistency between the normalized one or more sales activities and the sales data to create a write back storage table; and
a memory storing instructions that, when executed by the processor cause the system to instruct the intelligent write back system to write back the write back storage table, over a network, to the external CRM system, the write back storage table including the assigned confidence value, and to further write back, over the network to the external CRM system, information associated with how the assigned confidence value was determined.

18. The system of claim 17, wherein each entry in the write back storage table comprises one or more of: an email, a calendar event, a new buyer contact, a comment from a deal room, or a thread from a deal room.

19. The system of claim 17, wherein the memory is further configured to integrate the write back storage table into an application programming interface (API) of the external CRM system, wherein the API is a tenant API that has granted permission to the intelligent write back system to write data back into the external CRM system.

20. The system of claim 17, wherein the intelligent write back system is further configured to generate one or more insights related to the universal data model, the one or more insights each corresponding to one or more recommended user actions, and the memory is further configured to write back the one or more recommended user actions, over the network, to the external CRM system.

* * * * *